US012603390B2

(12) United States Patent
Shibutani et al.

(10) Patent No.: US 12,603,390 B2
(45) Date of Patent: Apr. 14, 2026

(54) SEPARATOR FOR NONAQUEOUS ELECTROLYTE SECONDARY BATTERY, AND NONAQUEOUS ELECTROLYTE SECONDARY BATTERY

(71) Applicant: Panasonic Intellectual Property Management Co., Ltd., Osaka (JP)

(72) Inventors: Satoshi Shibutani, Osaka (JP); Takahito Nakayama, Osaka (JP); Shuhei Uchida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 870 days.

(21) Appl. No.: 17/788,092

(22) PCT Filed: Oct. 15, 2020

(86) PCT No.: PCT/JP2020/038924
§ 371 (c)(1),
(2) Date: Jun. 22, 2022

(87) PCT Pub. No.: WO2021/131256
PCT Pub. Date: Jul. 1, 2021

(65) Prior Publication Data
US 2023/0046167 A1 Feb. 16, 2023

(30) Foreign Application Priority Data
Dec. 24, 2019 (JP) ................................. 2019-233120

(51) Int. Cl.
*H01M 50/446* (2021.01)
*H01M 4/62* (2006.01)

(52) U.S. Cl.
CPC ......... *H01M 50/446* (2021.01); *H01M 4/623* (2013.01); *H01M 4/624* (2013.01)

(58) Field of Classification Search
None
See application file for complete search history.

(56) References Cited

U.S. PATENT DOCUMENTS

2015/0236318 A1* 8/2015 Katayama ........... H01M 50/403
427/126.4

FOREIGN PATENT DOCUMENTS

CN 104979516 A 10/2015
CN 107039624 A 8/2017
(Continued)

OTHER PUBLICATIONS

Dipotassium phosphate, available online at https://en.wikipedia.org/wiki/Dipotassium_phosphate, date unknown.*
(Continued)

*Primary Examiner* — Anca Eoff
(74) *Attorney, Agent, or Firm* — WHDA, LLP

(57) ABSTRACT

This separator for a nonaqueous electrolyte secondary battery comprises a porous substrate, a heat-resistant layer that is formed on the porous substrate, and clusters of filler particles that are present in dot shapes on the surface of the heat-resistant layer. The filler particles are particles of a compound including at least one of phosphorus, silicon, boron, nitrogen, potassium, sodium, and bromine, and the transformation point at which the filler particles transform from a solid phase to a liquid phase or thermally decompose is in the range 180° C.-1000° C. This separator electrode for a nonaqueous electrolyte secondary battery can suppress heat production of the battery during a nail puncture test, while also suppressing an increase in battery resistance.

8 Claims, 2 Drawing Sheets

(56)  References Cited

FOREIGN PATENT DOCUMENTS

| CN | 108598338 A | | 9/2018 |
|----|----|----|----|
| JP | 2005276503 A | * | 10/2005 |
| JP | 2016-72120 A | | 5/2016 |
| JP | 6016757 B2 | | 10/2016 |
| JP | 6347580 B2 | | 6/2018 |
| WO | 2019/034143 A1 | | 2/2019 |

OTHER PUBLICATIONS

Monopotassium phosphate, available online at https://en.wikipedia.org/wiki/Monopotassium_phosphate, date unknown.*

Sodium triphosphate, available online at https://en.wikipedia.org/wiki/Sodium_triphosphate, date unknown.*

Potassium phosphate, available online at https://en.wikipedia.org/wiki/Potassium_phosphate, date unknown.*

Rakotomalala, M., Wagner, S., Doring, M.—Recent Developments in Halogen Free Flame Retardants for Epoxy Resins for Electrical and Electronic Applications, Materials, 2010, 3, pp. 4300-4327 (Year: 2010).*

Machine translation of JP2016-072120, published on May 9, 2016 (Year: 2016).*

Machine translation of JP2005-276503A, published on Oct. 6, 2005 (Year: 2005).*

Office Action dated Oct. 31, 2024, issued in counterpart CN Application No. 202080089417.3, with partial English translation. (9 pages).

International Search Report dated Dec. 22, 2020, issued in counterpart International Application No. PCT/JP2020/038924 (2 pages).

* cited by examiner

SEPARATOR FOR NONAQUEOUS ELECTROLYTE SECONDARY BATTERY, AND NONAQUEOUS ELECTROLYTE SECONDARY BATTERY

CROSS-REFERENCE TO RELATED APPLICATION

This application is a National Phase Application filed under 35 U.S.C. 8371 of International Application No. PCT/JP2020/038924 filed on Oct. 15, 2020 which claims the benefit of priority under 35 U.S.C. § 119(a) of Japanese Patent Application No. 2019-233120 filed in Japan on Dec. 24, 2019, the contents of which are incorporated herein by reference.

TECHNICAL FIELD

The present disclosure relates to a separator for a non-aqueous electrolyte secondary battery and a non-aqueous electrolyte secondary battery.

BACKGROUND

In recent years, as a secondary battery having high output and high energy density, a non-aqueous electrolyte secondary battery that performs charging and discharging by moving lithium ions between a positive electrode and a negative electrode has been widely used.

There is a nail penetration test as a safety evaluation test for confirming resistance to an internal short circuit of a battery. The nail penetration test is, for example, a test in which a nail penetrates into a battery to simulatively generate an internal short circuit and a degree of heat generation is examined to confirm safety of the battery. It is important to suppress the heat generation of the battery at the time of the nail penetration from the viewpoint of securing the safety of the battery.

For example, Patent Literature 1 discloses that a separator having excellent safety can be provided by providing a porous layer containing inorganic particles and basic phosphate in a separator disposed between a positive electrode and a negative electrode.

CITATION LIST

Patent Literature

Patent Literature 1: JP 6347580 B
Patent Literature 2: JP 6016757 B

SUMMARY

A separator for a non-aqueous electrolyte secondary battery according to an aspect of the present disclosure includes a separator substrate, and an aggregate of filler particles that is present in a dot shape on a surface of the separator substrate. The filler particles are compound particles containing at least one of phosphorus, silicon, boron, nitrogen, potassium, sodium, and bromine, and a transformation point of the filler particle at which the filler particle is transformed from a solid phase into a liquid phase or is thermally decomposed is in a range of 180° C. to 1,000° C.

A non-aqueous electrolyte secondary battery according to an aspect of the present disclosure includes a positive electrode, a negative electrode, and a separator disposed between the positive electrode and the negative electrode, and the separator is the separator for a non-aqueous electrolyte secondary battery.

According to the present disclosure, it is possible to suppress heat generation of a battery in a nail penetration test while suppressing an increase in battery resistance.

DESCRIPTION OF EMBODIMENTS

Hereinafter, embodiments of the present disclosure will be described with reference to the drawings.

Figure 1:
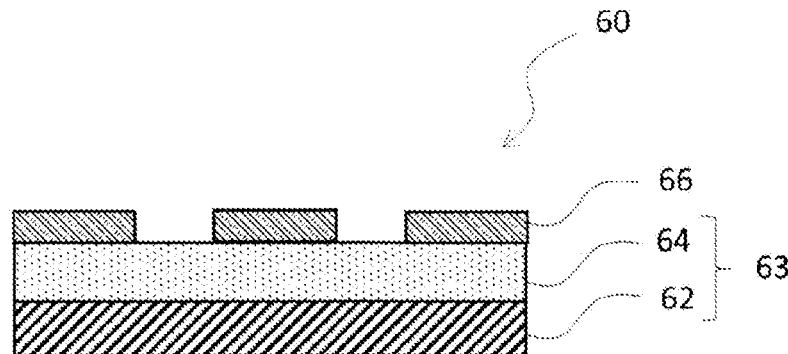
FIG. 1 is a schematic cross-sectional view illustrating an example of a configuration of a separator according to the present embodiment.

FIG. 1 is a schematic cross-sectional view illustrating an example of a configuration of a separator according to the present embodiment. A separator 60 illustrated in FIG. 1 is a separator for a non-aqueous electrolyte secondary battery. The separator 60 illustrated in FIG. 1 includes a separator substrate 63 including a porous substrate 62 and a heat-resistant layer 64 formed on the porous substrate 62. In addition, the separator 60 illustrated in FIG. 1 includes an aggregate 66 of filler particles that is present in a dot shape on a surface of the heat-resistant layer 64. However, the heat-resistant layer 64 is not essential, and the separator substrate 63 may be the porous substrate 62. In this case, the aggregate 66 is present in a dot shape of a surface of the porous substrate 62 that is the separator substrate 63. In addition, the aggregate 66 may be disposed on one or both surfaces of the separator substrate 63. In any case, a surface structure of the separator 60 according to the present embodiment is a sea-island structure having a sea region of the surface of the separator substrate and an island region of the aggregate 66. The aggregate 66 is an aggregation of a plurality of filler particles.

The filler particles constituting the aggregate 66 are compound particles containing at least one of phosphorus, silicon, boron, nitrogen, potassium, sodium, and bromine, and a transformation point of the filler particle at which the filler particle is transformed from a solid phase into a liquid phase or is thermally decomposed is in a range of 180° C. to 1,000° C.

By using the separator for a non-aqueous electrolyte secondary battery according to the present embodiment, an increase in battery temperature in a nail penetration test is suppressed. This mechanism is not sufficiently clear, but the following is presumed. Due to heat generation of the battery at the time of the nail penetration test, that is, heat generation of the battery when a nail penetrates into the battery and an internal short circuit is simulatively generated, the filler particles constituting the aggregate 66 are transformed from a solid phase into a liquid phase and flow on the surface of the separator substrate 63, or extend on the surface of the separator substrate 63 by thermal decomposition and become a coating film covering the surface of the separator substrate 63. The coating film functions as a resistor component, and thus, the amount of short circuit current flowing between the positive and negative electrodes through the nail is suppressed. As a result, an increase in battery temperature in the nail penetration test is also suppressed. The formation of the coating film after the transformation of the filler particles into the liquid phase depends on the type of filler particle, and is performed by, for example, an increase in temperature higher than a melting point of a filler material, a thermal fusion reaction, a dehydration condensation reaction, a thermal polymerization reaction, or the like.

In addition, according to the separator for a non-aqueous electrolyte secondary battery according to the present embodiment, an increase in battery resistance is suppressed. In normal use in which abnormal heat generation does not occur in a battery, since the aggregate 66 of filler particles is a material having low lithium ion conductivity, in a case where the aggregate 66 is present in a layer shape, movement of lithium ions is inhibited and an increase in battery resistance is caused. However, in the present embodiment, since the aggregate 66 has a dot shape, a gap exists between the aggregates 66, and ions such as lithium ions can easily pass through the gap. Therefore, it is considered that since lithium ions smoothly move between the positive and negative electrodes during charging and discharging of the battery as compared with a case where the entire surface of the separator substrate 63 is covered with a coating layer of filler particles without a gap, an increase in battery resistance is suppressed.

Hereinafter, a constituent material of the separator 60 will be described in more detail.

The filler particles are compound particles containing at least one of phosphorus, silicon, boron, nitrogen, potassium, sodium, and bromine and are not particularly limited as long as a transformation point of the filler particle at which the filler particle is transformed from a solid phase into a liquid phase or is thermally decomposed is in a range of 180° C. to 1,000° C. Examples of a material of the filler particle include a compound whose transformation point at which it is transformed from a solid phase into a liquid phase or is thermally decomposed is in a range of 180° C. to 1,000° C. among a phosphoric acid compound, a silicic acid compound, a boric acid compound, a melamine salt compound, a potassium salt compound, and a sodium salt compound. Examples of the phosphoric acid compound include metal phosphates such as phosphate-lithium salt, phosphate-sodium salt, phosphate-potassium salt, phosphate-calcium salt, phosphate-magnesium salt, and aluminum phosphate, condensed phosphates such as ammonium polyphosphate, sodium tripolyphosphate, and melamine polyphosphate, and phosphoric acid esters such as trimethyl phosphate and triphenyl phosphate. Examples of the boric acid compound include metal borates such as borate-sodium salt, borate-potassium salt, borate-calcium salt, borate-magnesium salt, aluminum borate, and melamine borate, boric acid esters such as trimethyl borate, boron oxide, and condensed borate. Examples of the silicic acid compound include metal silicate such as silicate-sodium salt, silicate-potassium salt, silicate-calcium salt, silicate-magnesium salt, silicate-barium salt, and silicate-manganese salt. Examples of the melamine salt compound include melamine cyanurate, melamine pyrophosphate, ethylene dimelamine, trimethylene dimelamine, tetramethylene dimelamine, hexamethylene dimelamine, and 1,3-hexylene dimelamine. Examples of the potassium salt compound include potassium pyrosulfate ($K_2S_2O_7$), potassium citrate monohydrate ($C_6H_5K_3O_7 \cdot H_2O$), and potassium carbonate. Examples of the sodium salt compound include sodium carbonate. Among them, melamine polyphosphate, ammonium polyphosphate, sodium tripolyphosphate, sodium silicate, sodium borate, potassium citrate monohydrate, lithium metaphosphate, potassium dihydrogen phosphate, melamine cyanurate, potassium pyrosulfate, boron oxide, ethylene-1,2-bis(pentabromophenyl), ethylenebistetrabromophthalimide, potassium carbonate, and sodium carbonate are preferable.

The transformation point of the filler particle may be in a range of 180° C. to 1,000° C., and is preferably in a range of 180° C. to 900° C., and more preferably in a range of 180° C. to 600° C. so that the filler particle is appropriately transformed from a solid phase into a liquid phase or is thermally decomposed due to heat generation of the battery in the nail penetration test.

A covering rate of the aggregate 66 to the surface of the separator substrate 63 is preferably 90% or less, and more preferably 65% or less, from the viewpoint of suppressing an increase in battery resistance. In addition, the covering rate of the aggregate 66 to the surface of the separator substrate 63 is preferably 20% or more and more preferably 30% or more from the viewpoint of suppressing an increase in battery temperature in the nail penetration test. The covering rate of the aggregate 66 is calculated as follows.

The covering rate is determined by performing element mapping of the separator surface by energy dispersive X-ray spectrometry (SEM-EDX) or the like. For example, a ratio of an area of the island region to a total area of the island region and the sea region is calculated by distinguishing the island region of the aggregate 66 and the sea region of the surface of the separator substrate by element mapping.

An average particle diameter of the filler particles is preferably 0.1 μm to 5 μm, and is more preferably in a range of 0.2 μm to 1 μm. When the average particle diameter of the filler particles satisfies the above range, the filler particles are rapidly transformed from a solid phase into a liquid phase due to heat generation of the battery at the time of the nail penetration test as compared with a case where the average particle diameter of the filler particles does not satisfy the above range. Thus, an increase in battery temperature in the nail penetration test can be effectively suppressed.

The aggregate 66 may contain a binder in addition to the filler particles described above. By containing the binder, a binding property between the filler particles or a binding property between the filler particles and the separator substrate 63 can be improved. Examples of the binder include polyvinylidene fluoride (PVdF), ethylene dimethacrylate, allyl methacrylate, t-dodecyl mercaptan, α-methylstyrene dimer, and methacrylic acid. Polyvinylidene fluoride (PVdF), ethylene dimethacrylate, allyl methacrylate, t-dodecyl mercaptan, α-methylstyrene dimer, and methacrylic acid can allow the electrode to adhere to the separator by applying a pressure and/or heat to the aggregate 66. In addition, the aggregate 66 may contain compound particles in addition to the filler particles described above. Examples of the compound particles in addition to the filler particles described above include inorganic particles formed of alumina, boehmite, titania, and the like.

The porous substrate 62 is, for example, a porous sheet that is formed of a microporous thin film, a woven fabric, a non-woven fabric, or the like and has an ion permeation property and an insulation property. Examples of a material forming the porous substrate 62 include polyethylene, polypropylene, polyolefin such as a copolymer of polyethylene and an α-olefin, an acrylic resin, polystyrene, polyester, and cellulose. The porous substrate 62 may have a single-layered structure or a multi-layered structure. A thickness of the porous substrate 62 is not particularly limited, and is, for example, in a range of 3 μm to 20 μm.

A porosity of the porous substrate 62 is preferably, for example, 30% or more and 70% or less from the viewpoint of securing an ion permeation property. The porosity of the porous substrate 62 is measured by the following method.

(1) 10 portions of a substrate are punched into a circular shape having a diameter of 2 cm, and a thickness h and a mass w of the central portion of the punched small piece of the substrate are measured.

(2) A volume V and a mass W of 10 small pieces are obtained from the thickness h and the mass w, and a porosity ε is calculated by the following equation.

$$\text{Porosity } \varepsilon \ (\%) = ((\rho V - W)/(\rho V)) \times 100$$

ρ: Density of material forming substrate

An average pore diameter of the porous substrate 62 is, for example, 0.02 μm or more and 0.5 μm or less, and preferably 0.03 μm or more and 0.3 μm or less. The average pore diameter of the porous substrate 62 is measured using a perm-porometer (manufactured by SEIKA CORPORATION) capable of measuring a fine pore diameter by a bubble point method (MS K3832, ASTM F316-86). A maximum pore diameter of the substrate 24 is, for example, 0.05 μm or more and 1 μm or less, and preferably 0.05 μm or more and 0.5 μm or less.

The heat-resistant layer 64 contains inorganic particles formed of alumina, boehmite, titania, or the like. By providing the heat-resistant layer 64, the heat resistance of the separator 60 can be improved. The heat-resistant layer 64 may contain, for example, a binder. By containing the binder, adhesiveness between the porous substrate 62 and the heat-resistant layer 64 can be secured. The binder is not particularly limited, and examples thereof include polyvinylidene fluoride (PVdF) and methacrylic acid.

A thickness of the heat-resistant layer 64 is not particularly limited, and is, for example, in a range of 1 μm to 10 μm. The heat-resistant layer 64 may be provided one or both surfaces of the porous substrate 62.

An example of a method for producing the separator 60 will be described. A filler slurry containing filler particles, a binder, a solvent, and the like is prepared. Then, the prepared filler shiny is sprayed, dropped, or applied onto the surface of the separator substrate 63, and drying is performed to form an aggregate 66 of filler particles that is present in a dot shape on the surface of the separator substrate 63. Examples of the solvent contained in the slurry include water and N-methyl-2-pyrrolidone (NMP).

A dot-shaped aggregate can be produced using, for example, a gravure coater method using a dot-shaped plate or a spray application method using a mask on which a dot-shaped through-pattern is formed.

Hereinafter, an example of the non-aqueous electrolyte secondary battery according to the present embodiment will be described.

Figure 2:
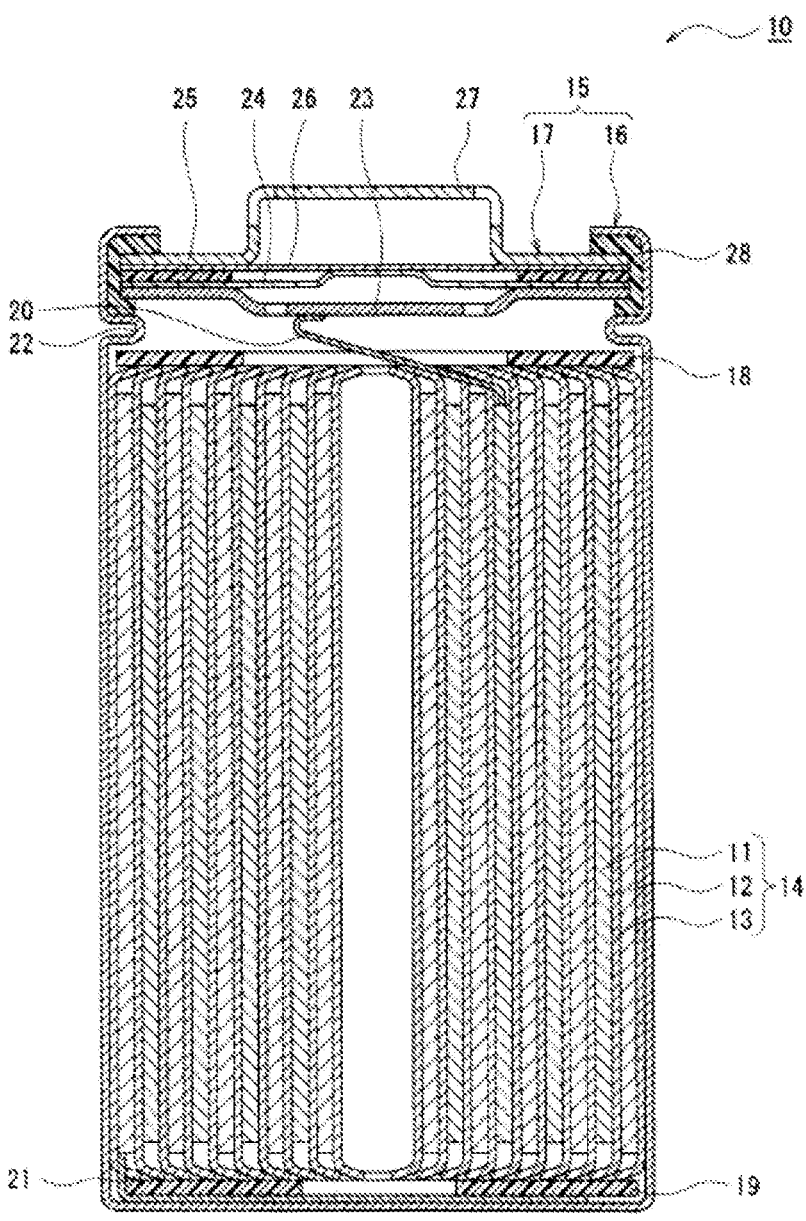
FIG. 2 is a schematic cross-sectional view illustrating a non-aqueous electrolyte secondary battery as an example of an embodiment.

FIG. 2 is a schematic cross-sectional view illustrating a non-aqueous electrolyte secondary battery as an example of an embodiment. A non-aqueous electrolyte secondary battery 10 illustrated in FIG. 2 includes a wound electrode assembly 14 formed by wounding a positive electrode 11 and a negative electrode 12 with a separator 13 interposed therebetween, a non-aqueous electrolyte, insulating plates 18 and 19 that are disposed on upper and lower sides of the electrode assembly 14, respectively, and a battery case 15 housing the members. The battery case 15 includes a bottomed cylindrical case main body 16 and a sealing assembly 17 for closing an opening of the case main body 16. Instead of the wound electrode assembly 14, another form of an electrode assembly such as a stacked electrode assembly in which a positive electrode and a negative electrode are alternately stacked with a separator interposed therebetween may be applied. In addition, examples of the battery case 15 include a metal case having a cylindrical shape, a square shape, a coin shape, a button shape, or the like, and a resin case formed by laminating resin sheets (so-called laminate type resin case).

The case main body 16 is, for example, a bottomed cylindrical metal container. A gasket 28 is provided between the case main body 16 and the sealing assembly 17 to secure a sealing property of the inside of the battery. The case main body 16 has, for example, a projection part 22 in which a part of a side part thereof projects inside for supporting the sealing assembly 17. The projection part 22 is preferably formed in an annular shape along a circumferential direction of the case main body 16, and supports the sealing assembly 17 on an upper surface thereof.

The sealing assembly 17 has a structure in which a filter 23, a lower vent member 24, an insulating member 25, an upper vent member 26, and a cap 27 are sequentially stacked from the electrode assembly 14 side. Each member constituting the sealing assembly 17 has, for example, a disk shape or a ring shape, and the respective members except for the insulating member 25 are electrically connected to each other. The lower vent member 24 and the upper vent member 26 are connected to each other at the respective central parts thereof, and the insulating member 25 is interposed between the respective circumferential parts of the vent members 24 and 26. When the internal pressure of the secondary battery 10 is increased by heat generation due to an internal short circuit or the like, for example, the lower vent member 24 is deformed so as to push the upper vent member 26 up toward the cap 27 side and is broken, and thus, a current pathway between the lower vent member 24 and the upper vent member 26 is cut off. When the internal pressure is further increased, the upper vent member 26 is broken, and gas is discharged through the opening of the cap 27.

In the non-aqueous electrolyte secondary battery 10 illustrated in FIG. 2, a positive electrode lead 20 attached to the positive electrode 11 extends through a through-hole of the insulating plate 18 toward a side of the sealing assembly 17, and a negative electrode lead 21 attached to the negative electrode 12 extends through the outside of the insulating plate 19 toward the bottom side of the case main body 16. The positive electrode lead 20 is connected to a lower surface of the filter 23 that is a bottom plate of the sealing assembly 17 by welding or the like, and the cap 27 that is a top plate of the sealing assembly 17 electrically connected to the filter 23 becomes a positive electrode terminal. The negative electrode lead 21 is connected to a bottom inner surface of the case main body 16 by welding or the like, and the case main body 16 becomes a negative electrode terminal.

The positive electrode 11 includes, for example, a positive electrode current collector and a positive electrode active material layer provided on the positive electrode current collector. As the positive electrode current collector, for example, a foil of a metal stable in a potential range of the positive electrode, such as aluminum, a film in which the metal is disposed on a surface layer, or the like can be used. In addition, it is preferable that the positive electrode active material layer contains a positive electrode active material and contains a conductive agent or a binder.

Examples of the positive electrode active material include lithium-transition metal composite oxides. Specifically, lithium cobaltate, lithium manganate, lithium nickelate, lithium nickel manganese composite oxide, lithium nickel cobalt composite oxide, and the like can be used, and Al, Ti, Zr, Nb, B, W, Mg, Mo, and the like may be added to these lithium-transition metal composite oxides.

As the conductive agent, carbon powders such as carbon black, acetylene black, Ketjen black, and graphite may be used alone or in combination of two or more thereof.

Examples of the binder include a fluorine-based resin such as polytetrafluoroethylene (PTFE) or polyvinylidene fluoride (PVdF), polyacrylonitrile (PAN), a polyimide-based resin, an acrylic resin, and a polyolefin-based resin. These binders may be used alone or in combination of two or more thereof.

The negative electrode 12 includes, for example, a negative electrode current collector and a negative electrode active material layer provided on the negative electrode current collector. As the negative electrode current collector, for example, a foil of a metal stable in a potential range of the negative electrode, such as copper, a film in which the metal is disposed on a surface layer, or the like can be used. In addition, it is preferable that the negative electrode active material layer contains a negative electrode active material and contains a binder and the like.

As the negative electrode active material, a carbon material capable of occluding and releasing lithium ions can be used, and in addition to graphite, non-graphitizable carbon, graphitizable carbon, fibrous carbon, coke, carbon black, and the like can be used. Furthermore, as a non-carbon-based material, silicon, tin, and a metal or an oxide mainly containing silicon and tin can be used.

Examples of the binder include a fluorine-based resin, PAN, a polyimide-based resin, an acrylic resin, a polyolefin-based resin, styrene-butadiene rubber (SBR), nitrile-butadiene rubber (NBR), carboxymethyl cellulose (CMC) or a salt thereof, polyacrylic acid (PAA) or a salt thereof (PAA-Na, PAA-K, and the like, or a partially neutralized salt may be used), and polyvinyl alcohol (PVA). These binders may be used alone or in combination of two or more thereof.

The separator 60 described above is applied to the separator 13.

The non-aqueous electrolyte contains a non-aqueous solvent and an electrolyte salt dissolved in the non-aqueous solvent. As the non-aqueous solvent, for example, esters, ethers, nitriles, amides, a mixed solvent of two or more thereof, and the like are used. The non-aqueous solvent may contain a halogen-substituted solvent in which at least some hydrogens in these solvents are substituted with halogen atoms such as fluorine. As the electrolyte salt, for example, a lithium salt such as $LiPF_6$ is used.

Next. Examples will be described.

EXAMPLES

Example 1

[Production of Positive Electrode]

100 parts by weight of a positive electrode active material represented by $LiNi_{0.82}Co_{0.15}Al_{0.03}O_2$, 1 part by weight of acetylene black (AB), and 1 part by weight of polyvinylidene fluoride (PVdF) were mixed, and an appropriate amount of N-methyl-2-pyrrolidone (NMP) was further added, thereby preparing a positive electrode mixture slurry. Next, the positive electrode mixture shiny was applied onto both surfaces of a positive electrode current collector formed of an aluminum foil, and the positive electrode current collector was dried. The positive electrode current collector was cut into a predetermined electrode size and was rolled using a roller to form a positive electrode active material layer on the both surfaces of the positive electrode current collector.

[Production of Negative Electrode]

100 parts by weight of a graphite powder, 1 part by weight of carboxymethyl cellulose (CMC), and 1 part by weight of styrene-butadiene rubber (SBR) were mixed, and an appropriate amount of water was further added, thereby preparing a negative electrode mixture shiny. Next, the negative electrode mixture slurry was applied onto both surfaces of a negative electrode current collector formed of a copper foil, and the negative electrode current collector was dried. The negative electrode current collector was cut into a predetermined electrode size and was rolled using a roller to form a negative electrode active material layer on the both surfaces of the negative electrode current collector.

[Production of Separator]

80 parts by weight of melamine polyphosphate particles and 20 parts by weight of polyvinylidene fluoride (PVdF) were mixed, and N-methyl-2-pyrrolidone (NMP) was further mixed so that a solid content ratio was 40 wt %, thereby preparing a filler slurry. The shiny was applied onto one surface of a single-layered polyethylene porous substrate having a thickness of 12 μm in a dot-shaped pattern using a gravure coater device, and the substrate was dried at 60° C. The substrate was used as a separator of Example 1.

When a surface of the separator of Example 1 was observed by SEM-EDX, it was confirmed that the shape of the aggregate of the melamine polyphosphate particles was a round dot shape having a size of φ300 μm, and a covering rate of the aggregate of the melamine polyphosphate particles was 30%.

[Preparation of Non-Aqueous Electrolyte]

Lithium hexafluorophosphate ($LiPF_6$) was dissolved in a mixed solvent obtained by mixing ethylene carbonate (EC), ethyl methyl carbonate (EMC), and dimethyl carbonate (DMC) at a volume ratio of 3:3:4 so that a concentration thereof was 1 mol/liter to prepare a non-aqueous electrolyte.

[Production of Non-Aqueous Electrolyte Secondary Battery]

(1) A positive electrode lead was attached to a positive electrode current collector, a negative electrode lead was attached to a negative electrode current collector, and then, a separator was disposed between a positive electrode and a negative electrode so that an aggregate of filler particles faced the positive electrode and then was wound, thereby producing a wound electrode assembly.

(2) Insulating plates were disposed on upper and lower sides of the electrode assembly, respectively, a negative electrode lead was welded to a case main body, a positive electrode lead was welded to a sealing assembly, and the electrode assembly was housed in the case main body.

(3) A non-aqueous electrolyte liquid was injected into the case main body by a pressure reduction method, and then, an end part of an opening of the case main body was sealed with the sealing assembly via a gasket. This was used as a non-aqueous electrolyte secondary battery.

Example 2

A separator was produced in the same manner as in Example 1, except that the gravure mesh roll pattern of the gravure coater device was changed in the production of the separator, and this separator was used as a separator of Example 2. When a surface of the separator of Example 2 was observed by SEM-EDX, it was confirmed that the shape of the aggregate of the melamine polyphosphate particles was a dot shape, and a covering rate of the aggregate of the melamine polyphosphate particles was 90%.

Example 3

A separator was produced in the same manner as in Example 1, except that polyvinylidene fluoride was replaced with butyl acrylate in the preparation of the filler slurry, and this separator was used as a separator of Example 3. When a surface of the separator of Example 3 was observed by SEM-EDX, it was confirmed that the shape of the aggregate of the melamine polyphosphate particles was a dot shape, and a covering rate of the aggregate of the melamine polyphosphate particles was 30%.

Examples 4 to 8

Separators were produced in the same manner as in Example 1, except that the melamine polyphosphate particles were replaced with ammonium polyphosphate particles in Example 4, sodium tripolyphosphate particles in Example 5, sodium silicate ($Na_2SiO_3$) particles in Example 6, sodium borate ($Na_2B_4O_7$) particles in Example 7, and potassium citrate monohydrate ($C_6H_5K_3O_7 \cdot H_2O$) particles in Example 8 in the preparation of the filler slurry. When surfaces of the separators of Examples 4 to 8 were observed by SEM-EDX, it was confirmed that the shape of each of the aggregates of the filler particles was a dot shape, and covering rates of the aggregates of the filler particles were 30%.

Comparative Example 1

A non-aqueous electrolyte secondary battery was produced in the same manner as in Example 1, except that the filler shiny was not used.

Comparative Example 2

A separator was produced in the same manner as in Example 1, except that the gravure mesh roll pattern of the gravure coater device was changed in the production of the separator, and this separator was used as a separator of Comparative Example 2. When a surface of the separator of Comparative Example 2 was observed by SEM-EDX, a covering rate of the aggregate of the filler particles covering the entire surface was 100%.

[Nail Penetration Test]

The non-aqueous electrolyte secondary batteries of Examples 1 to 8 and Comparative Examples 1 and 2 were subjected to a nail penetration test in the following procedure.

(1) Under an environment of 25° C., charging was performed at a constant current of 600 mA until a battery voltage reached 4.2 V and then, charging was continuously performed at a constant voltage until a current value reached 90 mA.

(2) Under an environment of 25° C., a tip of a round nail having a thickness of 2.7 mmφ was brought into contact with the central part of a side surface of the battery charged in (1), the round nail penetrated in a stacking direction of the electrode assembly in the battery at a speed of 1 mm/sec, and the penetration of the round nail was stopped immediately after a battery voltage drop due to an internal short circuit was detected.

(3) A temperature of a surface of the battery was measured 1 minute after a short circuit of the battery was started by the round nail. The measured temperature was summarized in Table 1 as the temperature after the nail penetration test.

[Battery Resistance]

The battery resistance of each of the non-aqueous electrolyte secondary batteries of Examples 1 to 8 and Comparative Examples 1 and 2 was measured as follows. Under a temperature environment of 25° C., the non-aqueous electrolyte secondary battery was charged at a constant current of 0.3 C until the battery voltage reached 4.2 V, the non-aqueous electrolyte secondary battery was charged at a constant voltage until the current value reached 0.05 C, and then, the non-aqueous electrolyte secondary battery was discharged at a constant current of 0.3 C to set SOC to 50%. Next, voltage values when discharge currents of 0 A, 0.1 A, 0.5 A, and 1.0 A were applied for 10 seconds were acquired. DC-IR was calculated from an absolute value of a slope when the voltage value after 10 seconds to each discharge current value was linearly approximated by a least-square method, and the value was summarized in Table 1 as the battery resistance.

TABLE 1

| | Filler particles | Covering rate of aggregate (%) | Binder | Battery resistance (mΩ) | Temperature after nail penetration test (° C.) |
|---|---|---|---|---|---|
| Example 1 | Melamine polyphosphate | 30 | P V d F | 52 | 490 |
| Example 2 | | 90 | P V d F | 52 | 490 |
| Example 3 | | 30 | Butyl acrylate | 50 | 500 |
| Example 4 | Ammonium polyphosphate | 30 | P V d F | 49 | 510 |
| Example 5 | Sodium tripolyphosphate | 30 | P V d F | 50 | 490 |
| Example 6 | Sodium silicate $Na_2SiO_3$ | 30 | P V d F | 51 | 490 |
| Example 7 | Sodium borate $Na_2B_4O_7$ | 30 | P V d F | 50 | 490 |
| Example 8 | Potassium citrate monohydrate $C_6H_5K_3O_7 \cdot H_2O$ | 30 | P V d F | 50 | 490 |
| Comparative Example 1 | None | 0 | None | 47 | 630 |
| Comparative Example 2 | Melamine polyphosphate | 100 | P V d F | 250 | 490 |

As shown in Table 1, in all of Examples 1 to 8 in which the aggregate of the filler particles was present in the dot shape on the surface of the polyethylene porous substrate, the battery temperature after the nail penetration test was lower than that in Comparative Example 1 in which the filler particles were absent on the surface of the polyethylene porous substrate. Here, when the covering rate of the aggregate of the filler particles was 100% as in Comparative Example 2, the battery resistance was significantly increased in comparison to Comparative Example 1. However, in Examples 1 to 8, an increase in battery resistance was suppressed in comparison to Comparative Example 2. That is, in Examples 1 to 8, an increase in battery resistance was suppressed, and heat generation of the battery in the nail penetration test was suppressed.

Examples 9 to 18

Separators were produced in the same manner as in Example 1, except that the melamine polyphosphate particles were replaced with lithium metaphosphate $((LiPO_3)_n)$ particles in Example 9, potassium dihydrogen phosphate $(KH_2PO_4)$ particles in Example 10, melamine cyanurate in Example 11, potassium pyrosulfate $(K_2S_2O_7)$ particles in Example 12, boron oxide $(B_2O_3)$ particles in Example 13, ethylene-1,2-bis(pentabromophenyl) particles in Example 14, ethylenebistetrabromophthalimide particles in Example 15, potassium carbonate $(K_2CO_3)$ particles in Example 16, sodium carbonate $(Na_2CO_3)$ particles in Example 17, and particles obtained by mixing 80 parts by weight of melamine polyphosphate particles and 20 parts by weight of alumina particles in Example 18 in the preparation of the filler slimy. When surfaces of the separators of Examples 9 to 18 were observed by SEM-EDX, it was confirmed that the shape of each of the aggregates of the filler particles was a dot shape, and covering rates of the aggregates of the filler particles were 30%.

The covering rates of the aggregates of the filler particles in Examples 9 to 18 are summarized in Table 2. In addition, in the non-aqueous electrolyte secondary batteries of Examples 9 to 18, the nail penetration test and the battery resistance measurement were performed. The results thereof are summarized in Table 2.

14 Electrode assembly
15 Battery case
16 Case main body
17 Sealing assembly
18, 19 Insulating plate
20 Positive electrode lead
21 Negative electrode lead
22 Projection part
23 Filter
24 Lower vent member
25 Insulating member
26 Upper vent member
27 Cap
28 Gasket
60 Separator
62 Porous substrate
64 Heat-resistant layer
66 Aggregate

The invention claimed is:

1. A separator for a non-aqueous electrolyte secondary battery comprising:

a separator substrate; and an aggregate of filler particles that is present in a dot shape on a surface of the separator substrate, wherein the filler particles comprise at least one of compound particles containing at least one of silicon, boron, and bromine; melamine polyphosphate; ammo-

TABLE 2

| | Filler particles | Covering rate of aggregate (%) | Binder | Battery resistance (mΩ) | Temperature after nail penetration test (° C.) |
|---|---|---|---|---|---|
| Example 9 | Lithium metaphosphate $(LiPO_3)_n$ | 30 | P V d F | 50 | 500 |
| Example 10 | Potassium dihydrogen phosphate $KH_2PO_4$ | 30 | P V d F | 51 | 500 |
| Example 11 | Melamine cyanurate | 30 | P V d F | 49 | 490 |
| Example 12 | Potassium pyrosulfate $K_2S_2O_7$ | 30 | P V d F | 50 | 490 |
| Example 13 | Boron oxide $B_2O_3$ | 30 | P V d F | 50 | 500 |
| Example 14 | Ethylene-1,2-bis (pentabromophenyl) | 30 | P V d F | 49 | 500 |
| Example 15 | Ethylenebistetrabromophthalimide | 30 | P V d F | 49 | 500 |
| Example 16 | Potassium carbonate $K_2CO_3$ | 30 | P V d F | 50 | 490 |
| Example 17 | Sodium carbonate $Na_2CO_3$ | 30 | P V d F | 50 | 500 |
| Example 18 | Melamine polyphosphate/alumina = 80 parts by weight/20 parts by weight | 30 | P V d F | 50 | 500 |

In all of Examples 9 to 18, the battery temperature after the nail penetration test was lower than that in Comparative Example 1 in which the filler particles were absent on the surface of the polyethylene porous substrate. In addition, the battery resistance was higher than that of Comparative Example 1, but was the same as that of Example 2. That is, also in Examples 9 to 18, an increase in battery resistance was suppressed, and heat generation of the battery in the nail penetration test was suppressed.

REFERENCE SIGNS LIST

10 Non-aqueous electrolyte secondary battery
11 Positive electrode
12 Negative electrode
13 Separator nium polyphosphate; lithium metaphosphate; sodium carbonate; melamine cyanurate; melamine pyrophosphate; ethylene dimelamine;

trimethylene dimelamine; tetramethylene dimelamine; hexamethylene dimelamine;

1,3-hexylene dimelamine; potassium pyrosulfate; potassium citrate monohydrate;

potassium carbonate, and a transformation point of the filler particles at which the filler particles are transformed from a solid phase into a liquid phase or is thermally decomposed is in a range of 180° C. to 1,000° C.; and wherein the separator substrate includes a porous substrate, and a heat-resistant layer provided on the porous substrate, the heat-resistant layer contains inorganic particles, and the inorganic particles contain at least one of alumina, boehmite, and titania.

2. The separator for a non-aqueous electrolyte secondary battery according to claim 1, wherein a covering rate of the aggregate to the surface of the separator substrate is 90% or less.

3. The separator for a non-aqueous electrolyte secondary battery according to claim 1, wherein a covering rate of the aggregate to the surface of the separator substrate is 30% or more.

4. The separator for a non-aqueous electrolyte secondary battery according to claim 1, wherein the filler particles contain at least one of the melamine polyphosphate, the ammonium polyphosphate, the lithium metaphosphate, a silicic acid compound, a boric acid compound, the sodium carbonate, an aromatic bromine-containing compound, the melamine cyanurate, the melamine pyrophosphate, the ethylene dimelamine, the trimethylene dimelamine, the tetramethylene dimelamine, the hexamethylene dimelamine, the 1,3-hexylene dimelamine, the potassium pyrosulfate, the potassium citrate monohydrate, and the potassium carbonate.

5. The separator for a non-aqueous electrolyte secondary battery according to claim 4, wherein the filler particles contain at least one of the melamine polyphosphate, the ammonium polyphosphate, sodium silicate, sodium borate, the potassium citrate monohydrate, the lithium metaphosphate, the melamine cyanurate, the potassium pyrosulfate, boron oxide, ethylene-1,2-bis(pentabromophenyl), ethylenebistetrabromophthalimide, the potassium carbonate, and the sodium carbonate.

6. The separator for a non-aqueous electrolyte secondary battery according to claim 1, wherein the aggregate further contains a binder, and the binder contains at least one of polyvinylidene fluoride, ethylene dimethacrylate, allyl methacrylate, t-dodecyl mercaptan, α-methylstyrene dimer, and methacrylic acid.

7. The separator for a non-aqueous electrolyte secondary battery according to claim 1, wherein the aggregate further contains inorganic particles, and the inorganic particles contain at least one of alumina, boehmite, and titania.

8. A non-aqueous electrolyte secondary battery comprising:

a positive electrode; a negative electrode; and a separator disposed between the positive electrode and the negative electrode, wherein the separator is the separator for a non-aqueous electrolyte secondary battery according to claim 1.

* * * * *